United States Patent [19]

Scheithauer et al.

[11] Patent Number: 4,612,039
[45] Date of Patent: Sep. 16, 1986

[54] PRODUCTION OF PURE COBALT METAL POWDER

[75] Inventors: Richard A. Scheithauer; Clarence D. Vanderpool; Michael J. Miller, all of Towanda, Pa.

[73] Assignee: GTE Products Corporation, Stamford, Conn.

[21] Appl. No.: 793,420

[22] Filed: Oct. 31, 1985

[51] Int. Cl.$^4$ .................................... C22B 15/00
[52] U.S. Cl. ........................... 75/0.5 AA; 75/0.5 BA; 75/97 A; 75/103; 75/108; 75/119; 423/143; 423/139; 423/413; 423/594; 423/150
[58] Field of Search ........ 75/0.5 AA, 0.5 BA, 101 R, 75/108, 103, 119, 97 A; 423/143, 139, 594, 413, 150

[56] References Cited

U.S. PATENT DOCUMENTS

| 4,184,868 | 1/1980 | Ritsko et al. | 423/143 |
| 4,208,380 | 5/1980 | Hamalainen et al. | 423/143 |
| 4,214,894 | 7/1980 | Ritsko et al. | 423/139 |
| 4,214,896 | 7/1980 | Cherecnowsky | 75/0.5 AA |
| 4,278,463 | 7/1981 | Vanderpool et al. | 75/119 |

*Primary Examiner*—John Doll
*Assistant Examiner*—Robert L. Stoll
*Attorney, Agent, or Firm*—L. Rita Quatrini; L. Rita Quantrini

[57] ABSTRACT

A method is disclosed for producing pure cobalt metal powder. The method involves reducing a cobalt containing source material to produce an intermediate cobalt metal, contacting this intermediate with an ammoniacal ammonium halide solution and a catalyst with oxidation to form a solution of hexamminecobalt(III) ions, removing insoluble material, and adding a sufficient amount of a halide salt to the solution to precipitate hexamminecobalt(III) halide which is separated from the mother liquor. The hexamminecobalt(III) halide precipitate is dissolved in water and the pH is adjusted to greater than about 10 with a base, while the solution is heated at a sufficient temperature for a sufficient time to form an insoluble cobalt oxide containing material which is separated from its mother liquor and reduced to pure cobalt metal powder.

5 Claims, No Drawings

PRODUCTION OF PURE COBALT METAL POWDER

BACKGROUND OF THE INVENTION

In the processing of cobalt it is often desirable to convert cobalt metal and oxides to pure water soluble cobalt salts. This is done typically by dissolution of the cobalt source material in mineral acids. The resultant soluble salts are converted to extrafine cobalt metal powder by a variety of techniques that include oxalates, carbonates, hydroxides, etc.

A disadvantage of dissolution by mineral acids is the formation of undesirable gaseous by-products such as hydrogen, chlorine, and $NO_x$ gases.

There are essentially no purification steps by these processes. Therefore the starting source itself must be relatively pure.

Therefore, a method which allows impure cobalt material to be converted to a pure cobalt salt and hence to a pure metal powder without undesirable by products would be desirable.

The following U.S. Patents relate to cobalt processing: U.S. Pat. No. 4,184,868 relates to a method for producing extra fine cobalt metal power by digesting cobalt pentammine chloride in ammonium hydroxide to obtain a black precipitate which contains cobalt and which is thereafter reduced to the metal powder. U.S. Pat. Nos. 4,214,894, 4,233,063, and 4,278,463 relate to improvements in 4,184,868 in which the ammonia solutions are processed to recover any cobalt therein. U.S. Pat. Nos. 4,395,278 and 4,469,505 relate to improvements in 4,184,868 in which fine cobalt metal powder is produced having reduced tailings.

U.S. Pat. No. 4,214,895 relates to a process for producing cobalt metal powder which involves treating an aqueous solution of a soluble cobaltic ammine halide with a sufficient amount of a soluble metallic hydroxide to form a cobalt containing precipitate which is thereafter reduced to metallic cobalt.

U.S. Pat. No. 4,218,240 relates to a method for producing cobalt metal powder by forming a solution of a cobalt hexammine compound from an acid solution and treating the solution with a metallic hydroxide to form a precipitate which is reduced to cobalt metal powder. U.S. Pat. Nos. 4,348,224 and 4,381,937 relate to improvements in the process described in 4,218,240 which involve removal of copper and silver from the cobalt. U.S. Pat. No. 4,452,633 relates to an improvement in the process described in U.S. Pat. Nos. 4,218,240 and 4,348,224 in which the silver is recovered.

U.S. Pat. No. 4,329,169 relates to a process for producing fine particle size cobalt metal powder absent tailings by heating an aqueous solution of soluble cobalt ammine halide to decompose the halide and form a cobalt containing precipitate which is reduced to the cobalt metal powder.

U.S. Pat. No. 4,409,019 relates to a process for producing fine cobalt metal powder from pieces of relatively pure cobalt by dissolving the cobalt pieces in an aqueous solution of hydrogen iodide and iodine and forming a cobalt containing solid which is subsequently reduced to a fine cobalt metal powder.

SUMMARY OF THE INVENTION

In accordance with one aspect of the invention, there is provided a method for producing pure cobalt metal powder. The method involves reducing a cobalt containing source material to produce an intermediate cobalt metal, contacting this intermediate with an ammoniacal ammonium halide solution and a catalyst with oxidation to form a solution of hexamminecobalt(III) ions, removing insoluble material, and adding a sufficient amount of a halide salt to the the solution to precipitate hexamminecobaltIII) halide which is separated from the mother liquor. The hexamminecobalt(III) halide precipitate is dissolved in water and the pH is adjusted to greater than about 10 with a base, while the solution is heated at a sufficient temperature for a sufficient time to form an insoluble cobalt oxide containing material which is separated from its mother liquor and reduced to pure cobalt metal powder.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The cobalt source material is typically oxides, hydroxides, oxalates, etc. typically having iron, nickel, and chromium as impurities at a level of from about 5 to about 25 weight percent. Other impurities such as aluminum, copper, manganese, and calcium can also be present at levels usually of from about 1 to about 5 weight percent.

The cobalt source material is first reduced to produce an intermediate cobalt metal. The reduction is done by standard techniques. For example, it can be done in a hydrogen atmosphere at a temperature of greater than about 500° C., preferably at from about 500° C. to about 800° C. Or it can be done in a nitrogen atmosphere at greater than about 500° C., preferably at from about 600° C. to about 900° C. with carbon as a reducing agent. Boric acid can be mixed with the material prior to reduction to help prevent pyrophoricity.

The resulting intermediate cobalt metal is then contacted with an ammoniacal ammonium halide solution and a catalyst, with oxidation to form a solution of hexamminecobalt(III) halide ions.

Typically, a mixture is formed of the intermediate cobalt metal, an ammonium halide and an ammonium hydroxide solution. The ammonium halide is preferably ammonium chloride. The preferred minimum amount of ammonium chloride is about 2 moles per mole of cobalt. The preferred minimum amount of ammonium hydroxide is about 6 moles per mole of cobalt. The pH of the resulting ammoniacal ammonium halide solution is from about 9.0 to about 9.7. The catalyst for the formation of the hexamminecobalt(III) ions is added to the mixture. The catalyst is preferably acitvated carbon, in particular activated charcoal. The oxidation is carried out preferably by bubbling air into the mixture, or, if faster oxidation is desired, by adding hydrogen peroxide. Usually from about 1 to about 5 ml of 30% hydrogen peroxide per 20g of cobalt is sufficient to oxidize all the cobalt to the +3 oxidation state.

The mixture is then preferably heated to about 40° C. and the solution of hexamminecobalt(III) ions is then separated from insoluble material by any standard technique such as filtration. Typically, iron, manganese, tungsten, silicon, and the activated carbon are present in the insoluble material. The solution can contain ammine complexes of nickel and copper.

Oxidation of the intermediate cobalt metal to hexamminecobalt(III) ions in an ammoniacal ammonium halide system does not result in liberation of gases such as hydrogen, halogens, $NO_x$, etc. Furthermore, oxidizing cobalt metal to hexamminecobalt(III) ions takes no longer and involves no more starting reagents than does the prior art practice of oxidation of a soluble cobaltous salt to an ammine complex.

Certain major impurities found in cobalt containing sources such as iron and manganese are not solubilized by this method and therefore, consumption of reagents is less than with acid digestions. Since iron and manganese report to the filtered insoluble material, subsequent mother liquors from the present process do not have to be further treated for their removal.

In the prior art practice in which hydrochloric acid is used, ions such as $Fe^{3+}$ and $Mn^{3+}$ can react with the hexamminecobalt(III) ion resulting in insoluble ammine complexes of these ions thus contaminating the cobalt hexammine. Therefore, in the prior art process, it is necessary to eliminate these impurities before the subsequent precipitation of the hexamminecobalt(III) halide.

A sufficient amount of a halide salt which is preferably a chloride salt and most preferably sodium chloride is then added to the hexamminecobalt(III) ion solution to form a precipitate consisting essentially of hexamminecobalt(III) halide. Typically from about 10 to about 15 moles of the halide salt are added per mole of cobalt.

Typically the resulting mixture is cooled to preferably about 15° C.

The hexamminecobalt(III) halide precipitate is then separated from the resulting mother liquor by any standard technique such a filtration. Impurities such as nickel and copper remain with the mother liquor which is at a pH of greater than about 7.

Treatment of the mother liquor to remove any cobalt is done at a pH of about 7 or higher. Since this mother liquor is at a pH of 7 or higher, no additional reagents are needed. In the prior art process in which hexamminecobalt(III) halide is precipitated in a hydrochloric acid system, the resulting mother liquor is at a pH of less than about 1. Ammonium hydroxide must be added to the mother liquor to a pH of 7 or higher to precipitate any cobalt. Thus a large amount of ammonium hydroxide is consumed.

The hexamminecobalt(III) halide precipitate (which is most preferably the chloride) can be further purified if necessary by washing with hydrochloride acid, preferably about 2N HCl and separating the acid insoluble hexamminecobalt(III) halide from the resulting hydrochloride acid wash by filtration or decantation.

The hexamminecobalt(III) halide precipitate is dissolved in water. The pH is adjusted with a base, preferably sodium hydroxide to the range in which the hexamminecobalt(III) halide decomposes to produce a cobalt oxide material. In actual practice, the pH is first adjusted to about 8 and the temperature of the solution is maintained at greater than about 30° C., and preferably at about 40° C. The result of this step is that some impurities precipitate out which are removed from the resulting pH adjusted solution by any standard technique such as filtration.

The solution is then heated at a sufficient temperature for a sufficient time while the pH is adjusted with a base, preferably sodium hydroxide to greater than about 10, and preferably greater than about 12 to decompose the hexamminecobalt(III) halide and form the insoluble cobalt oxide containing material. Preferably the hexamminecobalt(III) halide solution is heated to greater than about 90° C. and about 4N NaOH is slowly added to a pH of greater than about 12. The typical length of time for formation of the insoluble cobalt oxide containing material is from about 1 to about 2 hours.

The insoluble cobalt oxide containing material is then separated from the mother liquor by any standard technique such as filtration.

The cobalt oxide containing material is essentially a hydrated cobalt oxide.

The cobalt oxide material can be washed with hot water until essentially free of halide impurities.

The cobalt oxide material is then reduced to pure cobalt metal powder by standard methods. Typically the reduction is carried out in a hydrogen atmosphere at about 500° C. for about 2 hours.

Typically the purity of the cobalt metal powder is greater than about 99% and has a particle size of a typically from about 1.0 to about 1.5 microns.

To more fully illustrate this invention, the following non-limiting example is presented.

EXAMPLE

A cobalt containing source with the following analysis is used in this example: about 20% Co, about 19% Cr, about 0.1 to about 1.0% Al, Cu, Fe, Mn, Mo, and Ni.

About 100 grams of the material (containing about 20 grams of Co) is reduced in silica reduction boats in a hydrogen atmosphere at about 750° C. for about 2 hours. The resulting reduced material is cooled under nitrogen to room temperature before being removed from the reduction furnace. A mixture consisting essentially of about 100 grams of water, 82 grams of ammonium chloride, about 150 ml of ammonium hydroxide, about 5 grams of activated charcoal, and the reduced cobalt material is aerated for about 5 hours while the pH is maintained at about 9.8 and the temperature at less than about 25° C. After this period of time water is added to the mixture to a total volume of about 1 liter and the resulting mixture is heated to about 40° C. The insoluble material is removed by filtration. About 200 grams of NaCl is then added to the filtrate and agitated for about 1 hour while the mixture is cooled to about 15° C. The resulting precipitate of hexamminecobalt(III) chloride is removed from the mother liquor by filtration and dissolved in water and heated to about 40° C. Sodium hydroxide is added to a pH of about 8.5, and insolubles are removed by filtration. The resulting pure hexamminecobalt(III) chloride solution is then heated to greater than about 90° C. and about 4N NaOH is slowly added to a pH of about 12.8 to about 13.0. After agitation for an additional half hour, the insoluble cobalt oxide hydrate is separated from the mother liquor by filtration and the solids are washed with hot water until they are free of chlorides. Reduction of the cobalt oxide hydrate at about 500° C. for about 2 hours in a hydrogen atmosphere produces a pure extrafine cobalt metal powder.

Analysis of the final metal powder is as follows: (weight ppm on a Co basis)

| Ca | 56 | Cu | <3.0 | Mg | 30 | Mn | 10 |
|---|---|---|---|---|---|---|---|
| Ni | <10 | Si | 22 | Mo | 35 | Sn | <100 |

-continued

| Pb | <50 | Zn | <80 | Al | <50 | Cr | <8.0 |
| Fe | <15 | | | | | | |

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for producing pure cobalt metal powder, said method comprising:

(a) reducing a cobalt containing source material to produce an intermediate cobalt metal;

(b) contacting said intermediate cobalt metal with an ammoniacal ammonium halide solution and a catalyst, with oxidation to form a solution of hexamminecobalt (III) ions wherein said oxidation is carried out with an oxidizing agent selected from the group consisting of air and hydrogen peroxide;

(c) separating the resulting hexamminecobalt (III) solution from insoluble material;

(d) adding a sufficient amount of a halide salt to said hexamminecobalt (III) solution to form a precipitate consisting essentially of hexamminecobalt (III) halide;

(e) separating the hexamminecobalt (III) halide precipitate from the resulting mother liquor;

(f) dissolving said hexamminecobalt (III) halide precipitate in water and adjusting the pH of the resulting hexamminecobalt (III) halide solution to greater than about 10 with a base while heating the pH adjusted solution at a sufficient temperature for a sufficient time to decompose said hexamminecobalt (III) halide and form an insoluble cobalt oxide containing material;

(g) separating said insoluble cobalt oxide containing material form the resulting mother liquor; and (h) reducing said cobalt oxide containing material to pure cobalt powder.

2. A method of claim 1 wherein said ammonium halide is ammonium chloride.

3. A method of claim 1 wherein from about 10 to about 15 moles of said halide salt are added to said hexamminecobalt(III) solution per mole of cobalt.

4. A method of claim 3 wherein said halide salt is a chloride salt.

5. A method of claim 4 wherein said halide salt is sodium chloride and said base is sodium hydroxide.

* * * * *